Figure 1:
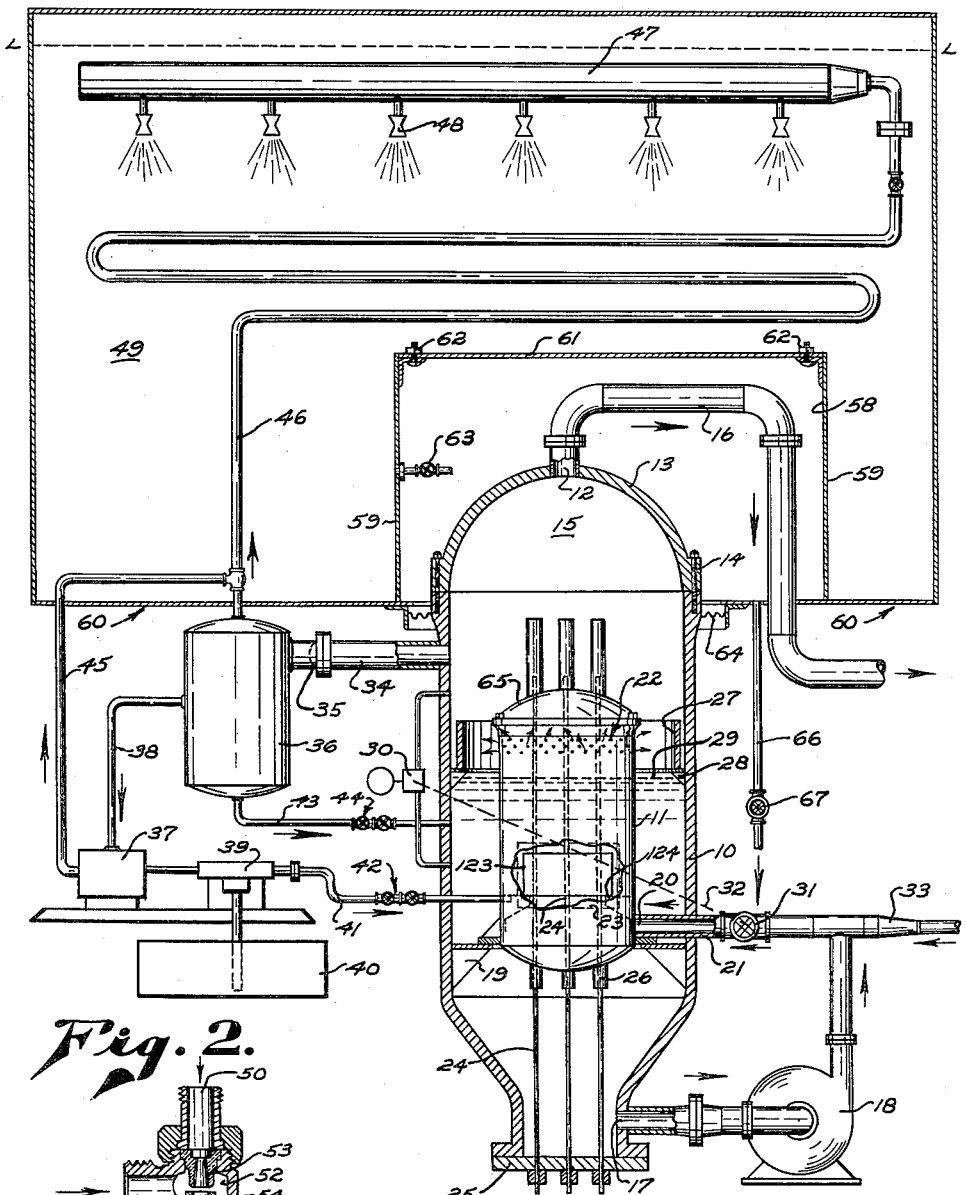

Sept. 4, 1962  F. L. JOHNS ET AL  3,052,615
NUCLEAR FLASH STEAM GENERATOR
Filed Aug. 26, 1955

FLOYD L. JOHNS
FRED C. GRONEMEYER
MARK R. DUSBABEK
INVENTORS

BY

United States Patent Office 3,052,615
Patented Sept. 4, 1962

3,052,615
NUCLEAR FLASH STEAM GENERATOR
Floyd L. Johns, Fred C. Gronemeyer, and Mark R. Dusbabek, Los Angeles, Calif., assignors, by mesne assignments, to the United States of America as represented by the United States Atomic Energy Commission
Filed Aug. 26, 1955, Ser. No. 530,799
5 Claims. (Cl. 204—193.2)

This invention relates generally to that type of steam generating system in which a nuclear reactor is utilized as the heat source, and more particularly has to do with novel steam generating apparatus characterized in its operation by the direct generation of steam from water heated by the nuclear reactor, thereby improving the operating efficiency and economy and reducing the overall cost of the nuclear steam generating plant.

At the present time, one of the reasons for the high cost of generating steam with nuclear devices, as compared with conventional steam generation, is based on the use of a separate circulatory heat transfer medium interposed between the reactor and the water from which steam is generated. Such a system, commonly referred to as a "two-loop" system, wherein heat generated by the reactor is first transferred to a heat transfer medium flowing in a first loop and subsequently transferred to water for generating steam in a second water and steam loop, presents the disadvantages of reduced efficiency deriving from cumulative heat losses resulting from multiple heat transfer, and high original equipment and operating costs allocable to the additional system components required for handling the intermediate transfer medium.

The present invention has for its primary purpose the provision of steam generating apparatus so designed and arranged that steam may be generated from water heated directly by the nuclear heat source, thereby eliminating the necessity for any intermediate heat transfer medium and components ordinarily required for handling that medium. In its preferred form the novel equipment consists of a pair of pressure vessels mounted one within the other, the inner vessel being sized for the reception of a nuclear reactor heat source within a zone formed in the lower portion thereof to which water in the closed steam and water circulatory system is pumped. A series of relatively small ports are formed in the upper portion of the inner vessel for jetting heated water under pressure outwardly into the atmosphere within the interior of the outer vessel, at which time part of the jetted water flashes into steam and the unconverted water is deflected downwardly for collection in the lower portion of the outer vessel. As a result, steam is formed at a pressure considerably reduced from that within the inner vessel, and is conducted through an outlet formed in the upper portion of the outer vessel for its intended use, typically in operating a steam turbine, while the water collected in the lower portion of the outer vessel is removed therefrom and recirculated at higher pressure by a suitable pump. Further, pressure within the inner vessel may be kept sufficiently high to prevent boiling therein.

The vessels are so positioned that water collecting in the lower portion of the outer vessel surrounds and stands at a level above the reactor zone within the inner vessel, with the result that the collected water acts to shield the reactor reducing the amount of radiation emanating to the exterior. Furthermore, a suitable liquid level control operates to maintain the water level above the reactor zone and below the steam jetting ports, for normal operation.

The invention also contemplates the provision of safety means communicating with the upper interior portion of the outer vessel and with the reactor zone within the interior vessel for flooding the zone with a concentrated solution of boric acid should the developed steam pressure exceed a predetermined critical limit, the boric acid molecules acting as effective neutron absorbers to slow down the rate of reaction of the nuclear core. For this purpose, a suitable pump or ejector may be provided to discharge boric acid to the reactor zone, the pump being driven by an appropriate steam turbine or engine and the ejector being operated by steam suddenly delivered thereto upon rupturing of an appropriately positioned steam gating diaphragm designed to rupture when the steam pressure exceeds the critical limit.

To permit removal and disposal of the nuclear core without radiation contamination, the outer vessel is provided with a removable head received within a recess formed in the bottom wall of a liquid receptacle, the latter including a removable closure for an opening opposite the head through which access to the nuclear core may be had after removal of the closure and head. For this purpose, the space between the head and receptacle bottom may be flooded with liquid passed from the receptacle to that space through a suitable valve.

Figure 2:
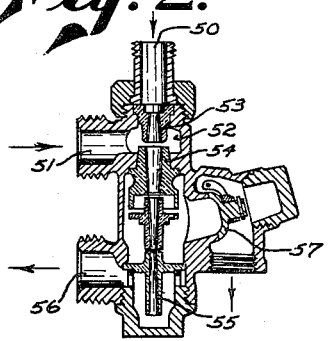

Other features and objects of the invention, as well as the details of an illustrative embodiment, will be more fully understood from the following description of the drawings, in which:

FIG. 1 is a view illustrating the essential components of the entire system including the necessary steam and water conduits, and showing details of the pressure vessels; and FIG. 2 is an enlarged sectional view taken through a suitable injector for use in place of the boric acid pump.

As shown in the drawings, the two upstanding cylindrical pressure vessels 10 and 11 are positioned so that the smaller inner vessel 11 is spaced from and within the outer vessel 10. The latter includes a steam outlet 12 formed in head 13, which is removably connected by suitable bolts 14 to the upper portion of the vessel 10, outlet 12 serving to pass the pressurized steam from chamber 15 within the vessel to steam pipe 16. The vessel 10 also includes a water outlet 17 in the bottom portion thereof for conducting water collecting in the lower portion of the vessel to the recirculating pump 18.

The interior pressure vessel 11 is conveniently mounted on flanges 19 connected into the outer vessel, so that the inner vessel remains positioned in spaced upstanding relation thereto. Demineralized water under pressure delivered by pump 18 is admitted to the bottom portion in the inner vessel 11 through inlet 20 formed by a pipe 21 extending through the wall of the outer vessel and connected into the wall of the inner vessel, and a large number of relatively small sized water exit ports 22 are formed circumferentially in an upper portion of the wall of the inner vessel. As will be brought out, water under pressure circulates from the lower portion of the inner vessel upwardly through a zone 23, indicated by the broken lines within the lower portion of the vessel, to the ports 22 from which it jets outwardly into the interior of the outer vessel.

In order to heat the water flowing to the ports 22, a suitable nuclear reactor heat source schematically indicated at 123 may be mounted on supports 124 within the zone 23, so that water may circulate upwardly in direct heat transfer contact therewith, a typical reactor comprising a series of horizontally spaced vertical plates formed with suitable gaps therebetween through which the water circulates in direct contact with the plates. For reaction rate control purposes, a series of vertically extending control rods 24, formed typically of boron steel or cadmium to absorb neutrons, are passed through openings in the bottom closure 25 of the outer shell and through the guide and pressure sealing sleeves 26 connected into the bottom wall of the inner vessel, so that the rods project upwardly through the spaces between the plates for manipulation from the exterior of the vessels.

In order to maintain maximum efficiency of heat transfer from the reactor elements to the water circulating upwardly in contact therewith, the pressure within the inner vessel 11 is maintained sufficiently high to prevent boiling therein by the pump 18 and by adjusting the size and number of ports 22. The port walls may be conveniently formed of Stellite to preclude erosion thereof, and a removable erosion ring 27 also formed of Stellite may be supported within the outer vessel in spaced relation to the ports and opposite thereto to protect the outer vessel from erosion. For this purpose a number of brackets 28 may be welded to the interior wall of the outer vessel to support the ring 27.

For steam generating purposes, the relatively high pressure and temperature of the water jetted outwardly through the ports 22 may be controlled in relation to the reduced pressure within the interior of the outer vessel by appropriately controlling the pump discharge pressure, the size and number of ports 22 and the heat delivered by the reactor, so that part of the jetted water flashes into steam subsequently rising at reduced pressure to the steam outlet 12, while the unconverted jetted water is deflected by ring 27 and falls within the outer vessel for collection therein in surrounding relation to the inner vessel 11, as shown. As a result, a large body of water collects in the lower portion of the outer vessel for continuous discharge through outlet 17 to the pump 18, the collected water also serving as a radiation shield to the extent it surrounds the zone 23, within which the nuclear reactor core 123 is mounted. In order to keep the upper surface 29 of the collected water above zone 23 and below ports 22, a liquid level recorder and controller 30 is installed at one side of the outer vessel, the level controller being of any suitable design and operating to regulate the amount of water flowing to the inner vessel 11 as by controlling inlet valve 31 through linkage mechanism indicated by the broken line 32. It will be understood, of course, that steam generated by the reactor may be utilized for any suitable purpose, as for example in driving a turbine generator, the condensate being pumped through line 33 to match the discharge pressure of pump 18 for combination flow to the interior vessel 11.

In the event of a nuclear incident, whereby control of the reactor is lost so that the reaction rate thereof suddenly increases to a dangerous level and generated steam pressure rises sharply, safety means are provided for flooding the reactor with a solution capable of absorbing neutrons, such as concentrated boric acid, in order to quickly and substantially reduce the nuclear reaction rate. For this purpose, another steam line 34 is connected into the upper portion of the outer vessel, and a suitable rupture disc 35 designed to rupture when the steam pressure reaches a critical value is connected into the line 34 between vessel 10 and steam separator 36. High pressure steam passing through the separator is fed to the turbine 37 through line 38, and a pump 39 driven by the turbine draws a concentrated solution of boric acid from the reservoir 40 for discharge through line 41 and two series connected check valves 42 to the zone 23. Water separated from the steam flows from the bottom of separator 36 through line 43 and the series connected pair of check valves 44 to the interior of the outer vessel 10 for combination with the water collected therein. Finally, exhaust steam from the turbine or engine 37 is led through discharge line 45 for combination with excess steam flowing from the separator 36 and subsequent delivery through line 46 to a header 47 and to the series of sparger discharge nozzles 48 connected therewith. Line 46 may be coiled, as shown, within a large body of water such as canal 49, and the sparger nozzles may be connected with the header to discharge into the canal, all for the purpose of dissipating the pressure head of the steam exhausted into the canal.

An alternative means for supplying boric acid to the zone 23 upon rupture of disc 35 is shown in FIG. 2 to comprise an injector designed to admit steam through its inlet 50 and boric acid through inlet 51. The vacuum generated within space 52 by steam passing through tube 53 draws the boric acid into the combining tube 54 for mixture with the flowing steam and discharge through the delivery tube 55 to outlet 56, the latter communicating through a suitable line with the reactor zone 23. An overflow valve 57 prevents malfunction of the injector by allowing discharge of excess boric acid and steam to a suitable over-flow or storage tank, not shown.

Access to the reactor zone 23 for adjustment or replacement of the nuclear core may be had after removal of the head 13 of the outer pressure vessel 10, which is received within a normally air-containing recess or chamber 58 formed between bottom wall 59 of the receptacle 60 containing the canal 49. A suitable closure 61 is removably connected as by bolts 62 to the flanged upstanding bottom walls 59 of the receptacle directly above the head 13, and a valve 63 connected into the wall 59 may be opened to admit canal fluid into and filling the chamber 58 prior to removal of closure 61. To prevent escape of fluid therefrom, a corrugated seal ring 64 is connected between the flanged bottom wall of the receptacle and the exterior of the outer pressure vessel 10, thereby accommodating lateral vibration of the vessel. After removal of closure 61 and head 13, the top 65 of the inner vessel 11 may be removed, exposing the interior thereof and zone 23, so that removal or adjustment of the reactor core may be accomplished. Finally, after replacement of the top 65, head 13 and closure 61, water within chamber 58 may be drained therefrom through discharge line 66 and control valve 67. Since recess 58 is normally not filled with canal liquid, contamination of the latter as by contact with the head 13 is prevented at all times other than during flooding of the recess, and in that event the contaminated water is suitably discharged after adjustment or removal of the reactor core is accomplished.

It will be understood that the entire steam generating apparatus may be housed within a thick concrete caisson or shell to reduce the amount of radiation at the exterior thereof to safe levels. While steam generated directly within vessel 10 is made radioactive by contact of the water from which the steam is generated by the nuclear reactor elements, its level of radioactivity is not dangerously high by virtue of its gaseous condition. Furthermore, the steam turbine or other equipment operated by the generated steam may be itself housed within a suitable concrete shell to prevent contamination.

We claim:

1. Steam generating apparatus, comprising a pair of upstanding pressure vessels mounted in spaced relation one within the other, the outer vessel having steam and water outlets respectively in the upper and lower portions thereof and the inner vessel being provided with a pressurized water type nuclear reactor heat source within a zone in the lower portion thereof through which water may circulate in direct heat transfer relation with said source, said inner vessel containing an inlet for water pumped to said zone and a plurality of relatively small-sized ports of sufficiently small size to prevent boiling of water in the pressure vessel are located in the upper portion thereof above said zone communicating with said steam outlet and through which heated water under pressure within said inner vessel is adapted to jet outwardly into said outer vessel for partial conversion into steam subsequently flowing to said steam outlet and for collection of the unconverted water in the lower portion of said outer vessel in surrounding relation to said inner vessel below said ports and subsequent delivery to said water outlet, means for maintaining the level of water in the lower portion of said outer vessel above said zone and below said ports, and a pump connected between said water outlet and inlet for re-circulating water collected in the lower portion of said outer vessel to said zone.

2. The invention as defined in claim 1 including means connected in steam receiving communication with the upper portion of said outer vessel and in fluid delivering communication with said zone for delivering thereto a solution capable of absorbing neutrons when the pressure of said steam rises beyond a pre-determined amount.

3. The invention as defined in claim 2 including a boric acid reservoir, a pump connected to receive acid therefrom and discharge acid to said zone, a steam actuatable device connected in driving relation with said pump, and a pressure rupturable diaphragm connected to receive steam at one side thereof from said outer vessel and to deliver said received steam upon rupturing to said device.

4. The invention as defined in claim 2 including a boric acid reservoir, an injector connected in acid entraining relation with said reservoir and in acid and steam delivering relation with said zone, and a pressure rupturable diaphragm connected to receive steam at one side thereof from said outer vessel and to deliver said received steam upon rupturing to said injector.

5. The invention as defined in claim 2 including a deflector ring mounted within said outer vessel opposite said ports in spaced relation thereto and against which water and steam jetted from said ports is adapted to impinge.

References Cited in the file of this patent

UNITED STATES PATENTS

| | | |
|---|---|---|
| 2,735,811 | Weinberg et al. | Feb. 21, 1956 |
| 2,743,224 | Ohlinger et al. | Apr. 24, 1956 |
| 2,743,225 | Ohlinger | Apr. 24, 1956 |
| 2,787,593 | Metcalf | Apr. 2, 1957 |
| 2,990,348 | Wollan | June 27, 1961 |

OTHER REFERENCES

Nuclear Reactor Development, Proceedings of a meeting held May 24, 1954, Sheraton Park Hotel, Washington, D.C.; Atomic Industrial Forum, Inc., 260 Madison Avenue, New York 16, N.Y., July 1954, pages 18, 37, 38.

July 1954, Nucleonics, pages 43–47.

Principles of Nuclear Reactor Engineering, by Samuel Glasstone, D. Van Nostrand Co., New York, July 1955, pages 819, 820.

The Industrial Atom, TID–8010, title: "The Pressurized Water Reactor Forum Held December 2, 1955, at Mellon Inst., Pittsburgh" (dated February 1955), Technical Information Service, Atomic Energy Commission, Washington 25, D.C., pp. 32, 35, 38.

Proceedings of the International Conference on the Peaceful Uses of Atomic Energy, held in Geneva, August 8–August 20, 1955, vol. 3, United Nations, New York, 1955, pages 250–262.